Oct. 2, 1962   J. J. KISHEL   3,056,290
MULTI-VEHICULAR AZIMUTH ALIGNMENT COMPUTER
Filed Dec. 31, 1959   4 Sheets-Sheet 1

JOHN J. KISHEL
INVENTOR.

BY
ATTORNEYS

Oct. 2, 1962
J. J. KISHEL
3,056,290
MULTI-VEHICULAR AZIMUTH ALIGNMENT COMPUTER
Filed Dec. 31, 1959
4 Sheets-Sheet 2
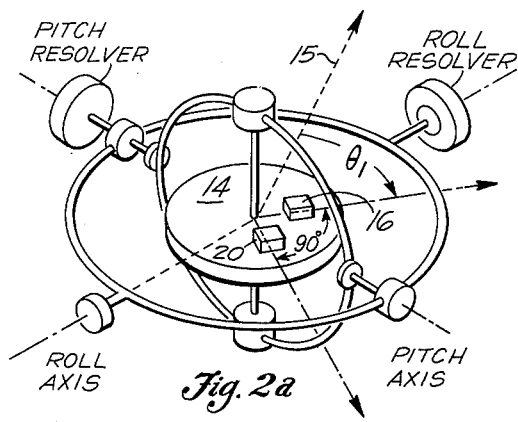
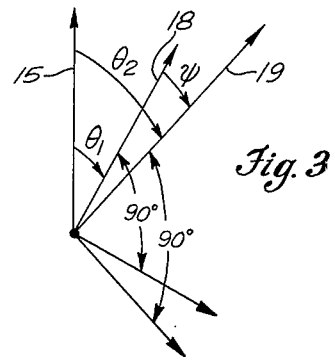
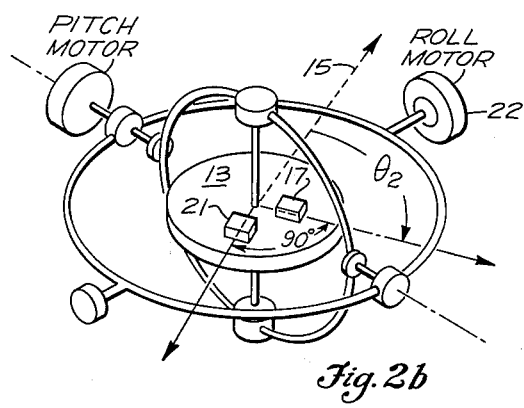
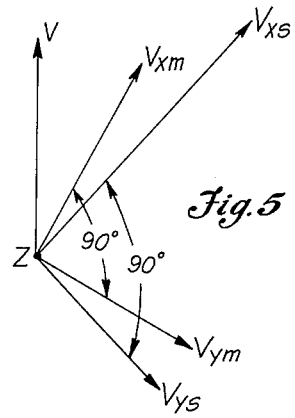
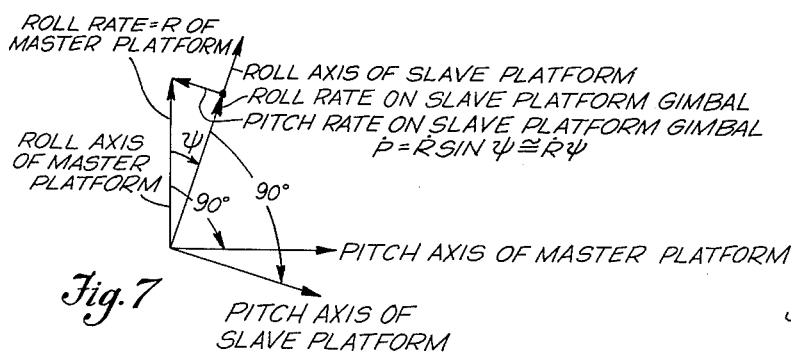
JOHN J. KISCHEL
INVENTOR.
BY Andrew L. Bain
ATTORNEYS

JOHN J. KISCHEL
INVENTOR.

BY Andrew L. Bain

ATTORNEYS

Oct. 2, 1962     J. J. KISHEL     3,056,290
MULTI-VEHICULAR AZIMUTH ALIGNMENT COMPUTER
Filed Dec. 31, 1959     4 Sheets-Sheet 4
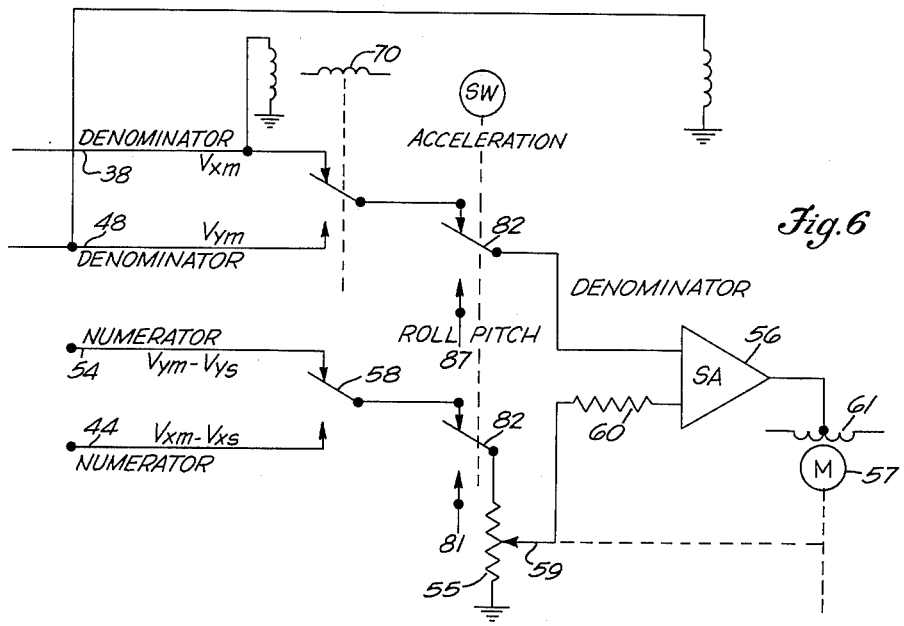
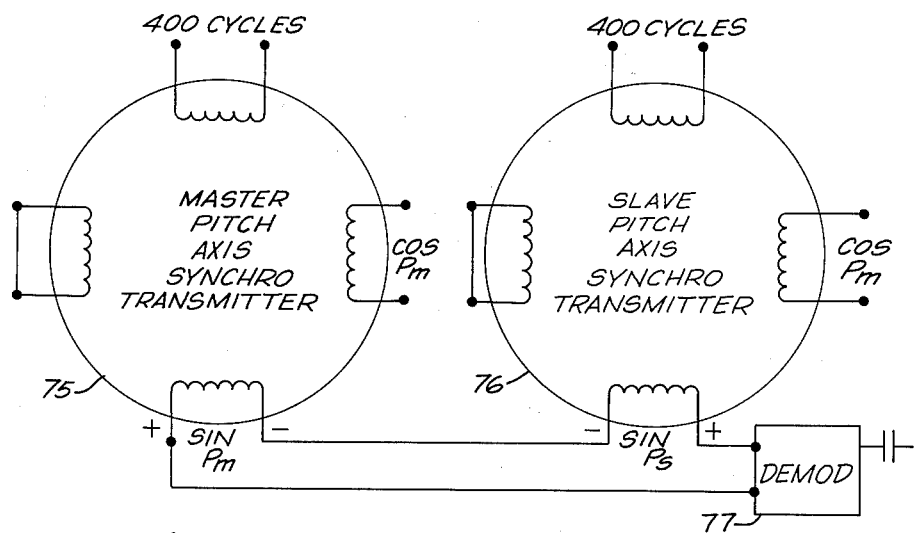
JOHN J. KISCHEL
INVENTOR.
BY  Andrew L. Bain
ATTORNEYS United States Patent Office 3,056,290
Patented Oct. 2, 1962

3,056,290
MULTI-VEHICULAR AZIMUTH ALIGNMENT
COMPUTER
John J. Kishel, Bloomfield, N.J., assignor to Kearfott
Company, Inc., Little Falls, N.J., a corporation of New
York
Filed Dec. 31, 1959, Ser. No. 863,293
2 Claims. (Cl. 73—178)

This invention generally relates to improvements in the means for aligning two movable members in the azimuth plane and is particularly concerned with the azimuth alignment of a gyroscopically stabilized platform as used in the navigation and control of movable craft.

Gyroscopically stabilized platforms have been widely used as a reference means in aircraft, watercraft and others due to the greater accuracy and other advantages provided over the use of the gyroscope devices alone. However the accuracy of such reference means is directly related to the precision in initially aligning its azimuth position with a similar master reference means located at a fixed launching base or on a mother craft, since the instructions or commands given to the movable craft are usually referenced to such an accurately determined position or attitude at the launching location or at the point of release from another aircraft. For example, in the many pilotless craft adapted to be carried by a mother craft and thereafter launched to seek a given target or follow a predetermined heading, it is necessary that the stabilized platform in the pilotless craft be precisely aligned with a master platform in the mother craft prior to launching. Known aligning means for this purpose are unsatisfactory, usually requiring expensive and complex optical, electrical, or mechanical devices for measuring and comparing the relative positions of the members, and hence cannot be operated with the ease and rapidity desired.

According to the present invention there is provided means for determining the azimuth misalignment between two platforms by measuring the directional response of the two platforms to a common velocity or acceleration. If the two platforms are in alignment, the response of directionally sensitive instruments thereon is substantially identical. However, if such platforms are not in proper alignment, the instruments on one such platform respond differently, or to a different degree, than those of the other platform thereby enabling an accurate determination to be made of the misalignment error. The present invention is to be particularly contrasted with those known devices which measure and compare the attitudes or positions of both platforms directly and by a comparison thereof seek to correct for misalignment.

It is accordingly one object of the invention to provide a more precise means for initially adjusting a gyroscopically stabilized platform to a desired azimuth attitude in space.

A further object is to provide such means operating incrementally to eliminate steady state errors.

A still further object is to precisely align such a platform by measuring its response to given accelerations and velocities, rather than by measuring its absolute position.

Another object is to perform such alignment by electromechanical means.

Other objects and many attendant advantages will be more readily comprehended by those skilled in the art after a detailed consideration of the following specification taken with the accompanying drawings wherein:

FIGURE 1 is a schematic diagram illustrating one manner of applying the present invention, FIGURES 2a and 2b are schematic illustrations of the master and slave stable platforms employed in the application of FIGURE 1, FIGURE 3 shows a vector diagram for illustrating the voltages being produced by the devices of FIGURES 2a, 2b and 4, and FIGURE 4 is an electrical schematic diagram for illustrating one preferred computation means according to the present invention.

FIGURE 5 is a vector diagram showing the relation between the velocities of the master and slave platforms, as used in the derivation of the formulas incorporated in the specifications.

FIGURE 6 is a schematic diagram of a portion of the circuit shown at the right-hand side of FIGURE 4 to clarify the operation of a portion of the switching mechanism shown in FIGURE 4.

FIGURE 7 is a vector diagram illustrating the relation between the pitch and roll rates of the master and slave platforms, as used in a modification of the construction described in the specifications, and shown in FIGURE 4 of the drawings.

FIGURE 8 is a schematic diagram showing the rate transmitters used in the master and slave platforms, in the modified circuit and construction, shown in the lower portion of FIGURE 4.

Figure 1:
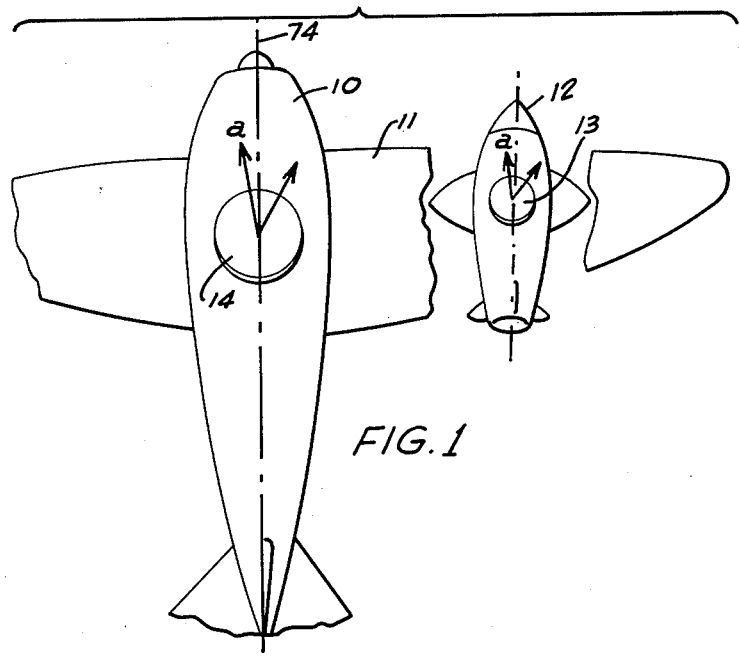

Referring now to the drawings, for a detailed consideration of one preferred embodiment of the invention, there is shown in FIGURE 1 a representation of an aircraft 10 carrying on its body portion or wing 11 as shown, a pilotless aircraft 12 which is adapted to be launched from the mother craft 10 and thereafter seek a predetermined target, follow a given flight path, or perform other such function as commanded or preprogrammed. The pilotless craft 12 internally carries a plurality of gyroscopes (not shown) suitably mounted on an inertial guidance platform 13 to maintain the platform stabilized in space about its three coordinate axes, thereby to provide a spacial reference for enabling the navigation or control system of the craft to continuously determine its heading, attitude or other condition with respect to this fixed reference platform.

As is well known to those skilled in the art, such platforms are generally mounted within a plurality of concentric gimbals as shown in FIGURE 2, for enabling the craft to deviate about any axis without disturbing the attitude of the platform. The platforms are generally maintained in this fixed attitude in space by means of a plurality of gyroscopes mounted thereon which energize a plurality of motors, such as motor 22 in FIGURE 2b, for positioning the platform within its gimbals to maintain its attitude fixed despite pivotal movement of the craft, during flying maneuvers.

In the mother aircraft 10, there is also provided a guidance platform 14 which is stabilized by gyroscopes in like manner. However, in the mother craft 10, there are also provided independent measuring devices and radio or other suitable means whereby the master platform 14 may be initially aligned in space and its attitude corrected from time to time, or as necessary, relative to an accepted standard, by such independent means to insure the utmost in accuracy.

According to the present invention there is provided an electrical means for maintaining coincidence in azimuth between the master platform 14 and the slave platform 13 without requiring access to the slave platform. Consequently when launching the pilotless craft 12, its stabilized platform 13 is in accurate azimuth alignment with the master platform 14, and may thereafter serve its intended function with the greatest accuracy.

According to the present invention, however, the means for aligning the slave platform with the master platform does not require position measuring devices to determine the error relation between the two platforms, but rather measures the response of the platforms to given accelerations or velocities, and thereafter utilizes such responses to correct for the instantaneous position of the slave platform. More specifically, it has been found that if the two platforms are not in azimuth alignment, a rapid acceleration of the mother craft 10 produces output signals from the two platforms that differ in proportion to the degree of misalignment thereof. For example, if the mother craft is accelerated in the direction in the azimuth plane indicated by the arrowed lines 15 as shown in FIGURES 2a and 2b, the master platform 14 and the slave platform 13 are both accelerated an equal amount in this direction. However, if the two platforms are not similarly aligned in azimuth, an accelerometer 16 mounted on the master platform 14 does not produce the same voltage output or acceleration indication as an accelerometer 17 similarly mounted on the slave platform 13, since the master platform accelerometer is oriented at one angle with respect to direction 15, whereas the slave platform accelerometer 17 is oriented at a different angle with respect to the direction 15.

Referring to the vector diagram of FIGURE 3, it is observed that in this example, the accelerometer 16 produces a voltage of amplitude 18 whereas accelerometer 17 produces a greater or lesser voltage having an amplitude 19, due to the fact that the sensitive axes of the two accelerometers are positioned at different angles with respect to this direction of acceleration 15.

To take into account the misalignment of the two platforms about X and Y axes in the azimuth plane, it has been found and may be matematically shown that the azimuth error is proportional to:

$$\psi = \frac{V_{xm} - V_{xs}}{V_{ym}} = -\frac{V_{ym} - V_{ys}}{V_{xm}}$$

In the above it is assumed that both the master platform 14 and the slave platform 13, are aligned, relative to the Z-axis, both platforms being assumed to be level.

In the above formulas:

$\psi$ is the azimuth error $V_{xm}$ is the velocity signal produced by integrating the output of accelerometer 16 on the master platform 14, $V_{xs}$ is the velocity signal produced by integrating the output of accelerometer 17 on the slave platform 13, $V_{ym}$ is the velocity produced by integrating the output of a second accelerometer 20 on the master platform, positioned at right angles to accelerometer 16, and $V_{ys}$ is the velocity signal produced by integrating the output of a second accelerometer 21 on the slave platform 13, positioned at right angles to accelerometer 17.

In the above formulas the same formulas are assumed for both the roll and pitch device, as for the acceleration device.

The derivation of the above formula is substantially as follows:

If a vector change, or movement V takes place in only one plane, for example, the azimuth plane, and this change is measured as components in two rectangular co-ordinate systems, that are offset relative to one another by an angle $\psi$, then by calculation from FIGURE 3 of the drawing, angle $\psi$ is in the same plane as the vector V, and the two co-ordinate systems.

$$V_{xs} = V_{xm} \cos \psi - V_{ym} \sin \psi$$
$$V_{ys} = V_{ym} \cos \psi + V_{xm} \sin \psi$$

If $\psi$ is a small misalignment, then $$\cos \psi \cong 1$$
$$\sin \psi \cong \psi$$

and it follows that $$\psi \cong \frac{V_{xm} - V_{xs}}{V_{ym}}$$

or $$\psi \cong -\frac{V_{ym} - V_{ys}}{V_{xm}}$$

Since the vector V is arbitrary, it could represent an integrated acceleration or an integrated angular velocity. Therefore, the derivation of the formulas applies equally to the two devices.

Thus by subjecting the aircraft 10 to an acceleration in the yaw or azimuth plane, the differing responses of accelerometers mounted on the master and slave platforms may be employed to determine the azimuth misalignment error and thereby enable correction of the slave platform to conform with the master platform. To bring about this correction, this error signal may be directed to energize the aximuth positioning motor 22 which thereupon rotates the slave platform 13 in azimuth until the error is substantially reduced to zero thereby bringing the two platforms into azimuth alignment.

Figure 4:
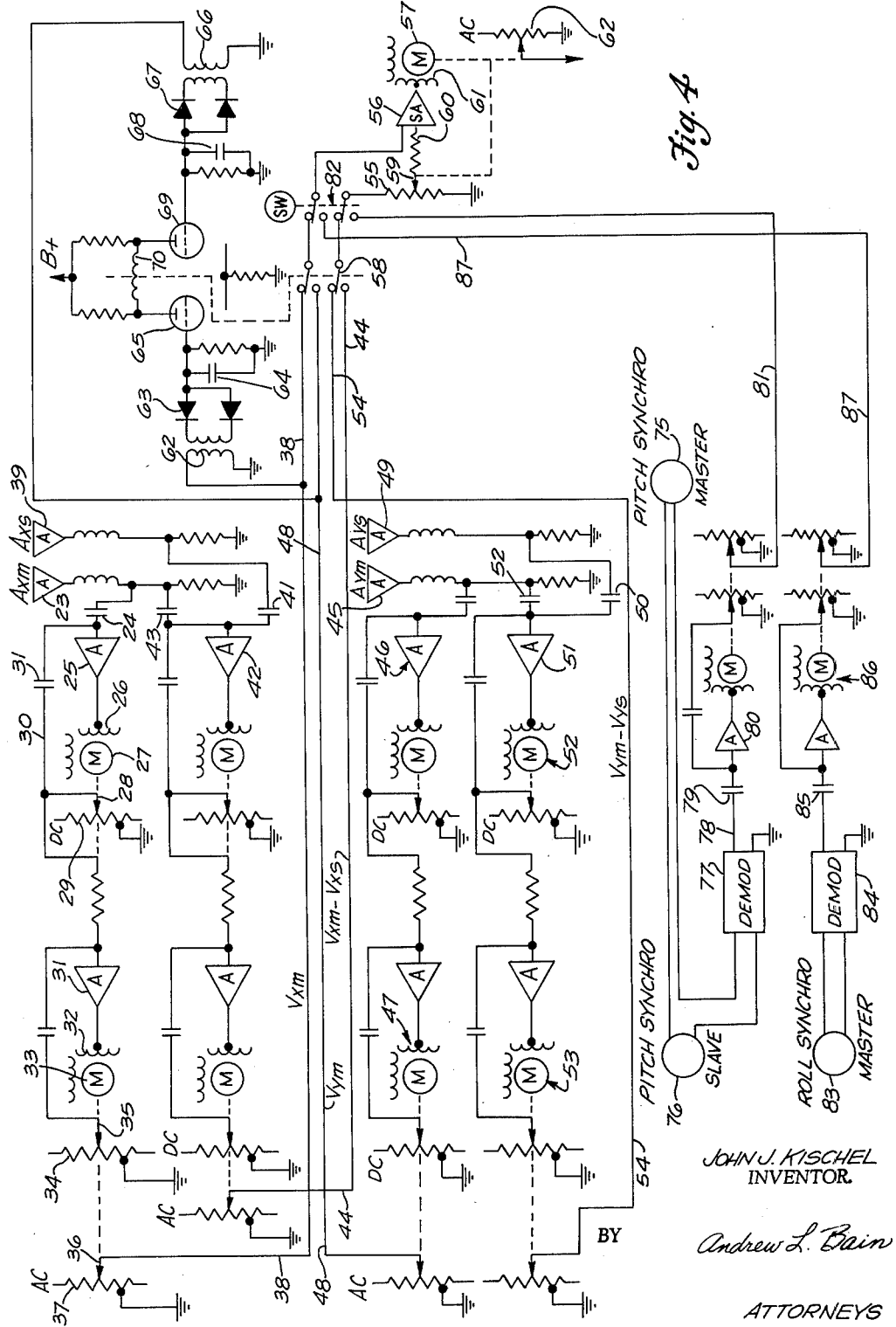

FIGURE 4 illustrates one preferred computing means for obtaining the azimuth misalignment error from the signal outputs of accelerometers 16, 20, and 17, 21 of FIGURES 2a and 2b.

As shown in FIGURE 4, the signal output obtained from accelerometer 16 on the master platform 14, and labeled $A_{xm}$, is introduced through suitable amplifying means 23 and across a precision resistor to ground. This signal as a voltage value may be obtained from a single axis accelerometer, such as that shown in U.S. Patent No. 2,985,021, issued to W. J. Krupick et al., and assigned to the assignee of the present invention. This signal is first differentiated by passing through a capacitor 24 and then entered into the amplifier 25 of an integrating servo. The purpose of this first differentiation is to eliminate any steady state errors in the accelerometer signal as may be caused by gravity or the like, and the later integration by the servo means is to again obtain the acceleration signal minus such steady state errors.

The integrating servo amplifier 25 energizes one winding 26 of servo motor 27, which thereupon rotates to position the movable slider 28 of a potentiometer 29 energized by a suitable direct current source. The voltage being produced at the movable contact 28 is connected in feed back relation over line 30, back into the input of servo amplifier 25 to balance out or null the input signal. However, due to the presence of a capacitor 31 in the feed back line 30, and the fact that a direct current source energizes potentiometer 29, the motor 27 continues to rotate until the movable potentiometer tap 28 has produced a change-in-voltage equal to the differentiated input signal over the line leading to amplifier 25. In feedback amplifiers with sufficiently high "open loop gain"

$$\frac{\text{Voltage Output}}{\text{Feedback Transfer Function}} = \frac{\text{Voltage Input}}{\text{Input Transfer Function}}$$

$$\text{or } \frac{V_0}{S} = \frac{V_i}{S}$$

From which $$SV_0 S V_i$$

$$V_0 = \frac{1}{S}(SV_i)$$

$$= \int \frac{d}{dt} V_i$$

$V_0$ is therefore the incremental change in $V_i$ and does not include harmful bias terms which exist before the change takes place.

The bias term most harmful is due to lack of alignment along the Z-axis, FIGURE 5, such as relative tilts between the master and slave platforms. The tilt acceleration ($g \times$ tilt) would have a damaging effect on the process of computing alignment. Thus, for example, if the amplifier 25 receives an input signal of 10 volts, the motor 27 is energized and positions the slider 28 until the voltage change produced over feed back line 30 equals 10 volts. When this occurs, the net voltage into amplifier 25 is zero and the motor 27 is deenergized, but a D.-C. voltage to ground still exists at the slider contact 28 due to the fact that the capacitor 31 prevents the passage of direct current therethrough. Thus, this motor feed back device serves as an incremental integrator producing an output voltage at movable tap 28 which is proportional to the sum or integral of all input signals introduced into the amplifier 25.

The signal at tap 28 is then directed to a second incremental integrating device similar to the first, and comprising a servo amplifier 31, motor control winding 32, motor 33, and direct current potentiometer 34 having a movable tap 35. Thus the accelerometer signal, minus any steady state error, is incrementally integrated to produce an output signal at slider contact 35 proportional to the integral of the acceleration, or the velocity quantity $V_{xm}$. Since it is desired to obtain an A.-C. output signal for further computation purposes, the slider contact 36 of an alternating current energized potentiometer 37 is also connected to be positioned by motor 33, whereby the output signal being directed over line 38 is an alternating current signal proportional to the velocity of the master platform 14 on the X direction or $V_{xm}$.

To obtain the difference between the integrated signals produced by accelerometer 16 on the master platform 14 and accelerometer 17 on the slave platform 13, the accelerometer 17 is reversely mounted on its platform, and its signal $A_{xs}$ being introduced into the amplifier 39 is accordingly in subtractive relation with the signal of accelerometer 16. From amplifier 39, the slave accelerometer signal is also introduced across a precision resistor to ground and the potential across the precision resistor is differentiated by a capacitor 41 before being introduced into a servo amplifier 42.

Servo amplifier 42 also receives the signal from master accelerometer 16 through a differentiating capacitor 43, and since slave accelerometer 17 is reversely poled, the net incremental signal being directed into the amplifier 42 is proportional to the difference between the two accelerometer signals. This differential signal is also integrated twice by means of two cascaded servo integrators of the same type as described above and the resulting alternating current signal being produced over line 44 is proportional to the integral of the difference between the signals of accelerometers 16 and 17 or the quantity $V_{xm}-V_{xs}$.

In relating the acceleration to velocities $$V_{xm}-V_{xs}=\int A_{xm}dt-\int A_{xs}dt=\int (A_{xm}-A_{xs})dt$$

Therefore, since the difference between two integrals is the same as the integral of the differences between the functions, the order of the integrating operations is unimportant mathematically. The latter form is computed more accurately and is therefore the preferred form.

In a similar manner to that described above, the signal from the second master accelerometer 20, or $A_{ym}$, is introduced into an amplifier 45, differentiated through a capacitor, and thence passed through two incremental servo integrators, generally labeled 46 and 47, to produce an A.-C. output signal proportional to the velocity of the master platform 14 in the y direction or $V_{ym}$, over line 48.

The signal from the second slave accelerometer 21 is also introduced into an amplifier 49 and differentiated through a capacitor 50. However, this slave accelerometer 21 is oppositely poled to master accelerometer 20 whereby when the output of the latter is differentiated through capacitor 52 and introduced into the same amplifier 51, the amplifier receives a net energization proportional to the difference between the two signals. This difference signal is thereafter passed through two incremental servo integrators 52 and 53 to provide an alternating current output signal over line 54 proportional to the difference between the velocities of the two platforms in the Y direction or the quantity $V_{ym}-V_{ys}$.

Thus over output line 38 there is produced a signal proportional to the velocity of the master platform 14 in the X direction; over line 48 there is produced a signal proportional to the velocity of the master platform 14 in the Y direction; and over lines 44 and 54 there are produced signals proportional to the difference in the velocities of the master and slave platforms in the X and Y directions, respectively.

As will be recalled from the previous description, the misalignment error between the two platforms 13 and 14 may be found by dividing the difference in velocity of the two platforms in the X direction by the velocity of the master 14 in the Y direction, or alternatively by dividing the difference in velocity of the two platforms in the Y direction by the velocity of the master platform 14 in the X direction. This mathematical function is performed by division servo means comprising a potentiometer 55, a summing amplifier 56, and a servo motor 57 as shown in the right hand portion of FIGURE 4.

As shown in FIGURES 4 and 6, two double throw switches 58 and 82 are provided, double throw switch 58 will determine which of the two of the foregoing equations for $\psi$, namely $$\frac{V_{xm}-V_{xs}}{V_{ym}} \text{ or } \frac{V_{ym}-V_{ys}}{V_{xm}}$$

are to be used, and this determination is made by a decision making circuit as hereinafter explained. On the other hand, double throw switch 82 will open circuits so as to make use of neither of the two foregoing equations but instead use another system to accomplish this objective as hereinafter described. The decision to open the circuits and use the other system is made by the pilot from the control station. When however, use of the two foregoing equations is made, the signal proportional to the difference in velocities in the Y direction, and being generated over line 54, is directed through one of the contacts of a double-pole-double throw switch 58 and through switch 82 to energize potentiometer 55, and a portion of this potentiometer signal is obtained from the movable slider 59. This variable portion of the signal from line 54 is thence directed through a resistor 60 to the input of summing amplifier 56. Also energizing summing amplifier 56 is the signal obtained from line 38, which as indicated above, is proportional to the velocity of the master platform in the X direction. Summing amplifier 56 produces an output signal proportional to the difference between these two quantities, which output energizes the control winding 61 of motor 57, which thereupon operates in feed back to reposition the movable contact 59 of potentiometer 55 until the two signal quantities energizing the amplifier 56 are equal and opposite. When this occurs, the motor winding 61 is deenergized to stop the motor 57 thereby completing the mathematical division of the two quantities.

As is believed evident from the above description, the division servo means functions as a ratio determining device to perform the mathematical division operation. That is, the ultimate position of slider contact 59 indicates the ratio between the two signals, since this slider is adjusted to select a given percentage or ratio of one signal that equals the other. For example, if the slider 59 is positioned at the uppermost terminal of potentiometer 55, it is evident that the ratio between the two signals is 1 because the full magnitude of the signal over line 54 equals that over line 38. On the other hand, if slider 59 is positioned midway between the terminals of potentiometer 55 when the servo is at null, then the transmitted portion of the signal received from line 54 is twice as great as that received from line 38 since only one-half of this signal is necessary to balance out the signal over line 38. In the same manner, any intermediate position of the slider 59 indicates the ratio or quotient between the transmitted portion of the signals received from lines 54 and 38 and consequently yields the error in azimuth position.

This azimuth error is then converted into an electrical signal by means of pickoff potentiometer 62, and the error signal generated thereby may be employed to operate the azimuth motor 22 of the slave platform 13 (FIGURE 2) thereby to rotate the slave platform into azimuth alignment with the master platform 14.

As was generally discussed above, the misalignment of the two platforms in azimuth may be determined by either dividing the differences in measured velocity in the X direction by the measured velocity of the master platform in the Y direction, or by dividing the differences in measured velocity in the Y direction by the measured velocity of the master platform in the X direction. Theoretically speaking, either ratio may be computed with like result. However as a practical matter when small angles $\theta_1$ and $\theta_2$ exist between the sensitive axes of the accelerometers and the direction of acceleration 15, it is more accurate for computation purposes to use the ratio obtained by subtracting the differences from the Y axis accelerometers and dividing by the larger signal obtained from the X axis master platform accelerometer 16. According to the present invention there is provided a decision making circuit which operates to determine which of the two ratios will yield the greatest accuracy and such circuit is schematically shown in the upper righthand portion of FIGURE 4.

Returning to FIGURE 4, it is noted that the signals over lines 38 and 54 may be employed to compute the azimuth error as discussed above or, the signals over lines 48 and 44 may be alternatively used since these latter signals represent the velocity difference signal in the X axis direction (line 44) and the velocity signal of the master platform 14 in the Y axis direction (line 48). If the signal over line 38 is greater than that over line 48, a greater accuracy is obtained using lines 38 and 54 whereas for the reverse condition, it is preferred to compute the ratio using the signals over lines 48 and 44.

FIGURE 6 represents a more detailed explanation of the control of the relay 70 by means of the switch 58.

Energizing relay 70, shown in FIGURES 4 and 6, simply transfers the solution of one form of the misalignment equation to another depending upon the magnitude of the denominator term in the formula.

To insure greater accuracy of computation, the formula with the largest denominator is preferred for the acceleration device.

In FIGURE 4, line 38 carries one denominator term and line 48 carries another denominator term. These denominator terms are compared in the electron tubes 65, 69, to operate relay 70, as required.

To perform this decision making function, the signal over line 38 is directed upward to a rectifying circuit, including a transformer 62, rectifiers 63 and a capacitor 64 to develop a direct current potential at the control grid of electron tube 65 proportional to its amplitude. Similarly, the signal over line 48 is directed upwardly to a rectifying circuit, including transformer 66, rectifiers 67, and a capacitor 68, to develop a direct current potential at the control grid of electron tube 69 proportional to its amplitude. The plate elements of electron tubes 65 and 69 are each connected to opposite terminals of the relay winding 70 whereby when one of tubes 65 or 69 conducts more current than the other, the winding 70 receives current flow in one direction therethrough, whereas if the opposite tube conducts more current than the first, the current through the relay winding 70 is reversed. As the relay conducts in one direction in response to a greater voltage signal over line 38, its contacts 58 are positioned as shown to connect the signals over lines 38 and 54 with the division servo. However, whenever the signal over line 48 is greater than that over line 38, the current through the relay is reversed and the contacts 58 are positioned to connect the signals over lines 48 and 44 with the division servo. Consequently, according to the present invention, this decision making circuit automatically selects the most favorable input quantities to compute the error in azimuth misalignment of the two stabilized platforms.

As thus far described, it is observed that the azimuth error in misalignment of the platforms is obtained by subjecting the aircraft to an acceleration maneuver in the azimuth plane and utilizing the differing responses obtained from direction sensitive accelerometers fixedly mounted on the two platforms to obtain the difference in azimuth position therebetween.

According to the present invention, this azimuth error in position between the two platforms may also be computed using the different responses of the platforms to a roll or other maneuver of the aircraft. More specifically if the aircraft of FIGURE 1 is placed in a roll about its longitudinal axis 74, the signals being generated by instruments aboard the master and slave platforms 14 and 13 will vary if the platforms are not in azimuth alignment, since the sensitive axes of these instruments will be oriented at different angles to the direction of roll. In a similar manner this azimuth error may be determined by other maneuvers of the aircraft which are measurable by the direction sensitive instruments on board the stable platforms.

FIGURE 7 shows the method of employing the pitch rate, in place of the linear accelerations and velocities as shown in the lower portion of the circuit shown in FIGURE 4.

In FIGURE 7, $$\psi = \frac{\int (\dot{P}_\mathrm{m} - \dot{P}_\mathrm{s}) dt}{\int \dot{R}_\mathrm{m} dt}$$

$$\psi = \frac{\Delta \dot{P}_\mathrm{m} - \Delta \dot{P}_\mathrm{s}}{\Delta \dot{R}_\mathrm{m}}$$

Where

The angle $\psi$ is the angle between the roll rate of the master platform, and the roll rate of the slave platform as shown in FIGURE 7.

$\dot{R}$ is the roll rate of the master platform.

$\dot{P}$ = pitch rate of the slave platform gimbal, assuming the pitch rate of the master platform is zero.

$$= \dot{R} \sin \psi \simeq \dot{R}$$

From the right triangle shown in FIGURE 7

$$\dot{R}\psi = \dot{P}$$

$$\psi \int \dot{R} dt = \int \dot{P} dt$$

$$\psi = \frac{\int \dot{P} dt}{\int \dot{R} dt}$$

If a pitch rate were to be superimposed on the roll rate by a disturbance, then it can be accounted for by subtracting the pitch measurement of the two platforms to yield the required numerator term in the above formula, depending only on the extent of the misalignment. Therefore the pitch rate transmitters are connected in opposition to one another to yield the required difference item, in the manner shown in FIGURE 8. The pitch synchro transmitters referred to above are the usual four-wire synchro transmitters. In these devices, the stator is attached to the roll gimbal of the particular platform, and the rotor attached to the pitch gimbal of the platform.

The master and slave transmitters are connected to one another in the manner shown in FIGURE 8.

Considering in greater detail the computation means for determining the azimuth error during a roll maneuver, there is shown in the lower central portion of FIGURE 4, a unit 75 labeled "Pitch Synchro M" and a unit 76 labeled "Pitch Synchro S," with the former designating the pitch axis transmitter normally made a part of the master platform 14 and the latter being the similar pitch axis transmitter normally made a part of the slave platform 13. Each of the instruments 75 and 76 produces an electrical signal proportional to angular displacement of its related platform relative to the craft about the pitch axis.

As shown, the signal outputs of these resolvers are preferably connected in subtractive relation, and the difference signal is introduced into the input of a demodulator 77, functioning to remove the alternating current carrier and produce an output signal over line 78 proportional to their difference in amplitude. This difference signal over line 78 is differentiated by a capacitor 79 to eliminate steady state errors and thence directed into the servo amplifier 80 of an incremental integrating servo similar to the integrators discussed above. The integrated difference signal is obtained over output line 81 and directed upwardly to the lowermost contact of the double pole double throw selecting switch 82.

A signal from the roll synchro device 83, normally made a part of the master platform 14, is also directed to a demodulator 84, thence differentiated by a capacitor 85, and finally incrementally integrated by the servo 86, to provide an output signal over line 87. This latter output signal over line 87 is directed upwardly to the second highest contact of selecting switch 82.

The movable contacts of switch 82 are connected to the division servo including the ratio potentiometer 59 and the other elements discussed above, whereby when these movable contacts are positioned to engage the terminals connected to lines 81 and 87, the signal over line 87 is divided by the signal over line 81 to yield the azimuth misalignment error.

Thus the azimuth misalignment error between the master and slave platforms may also be obtained by placing the mother craft 10 in a roll maneuver, and determining the ratio between the signals obtained from the pitch axis and roll axis synchros normally forming a part of the stabilized platform devices. The function of selecting switch 82, which may be mounted on the pilot's control box, is obviously to enable the operator or pilot to select the mode of computing the azimuth misalignment. If it is desired to determine misalignment by accelerating the mother craft, the selecting switch may be positioned to engage the first and third contacts as shown in FIGURE 4. Alternatively, if desired, the pilot may correct for misalignment by positioning switch 82 to select the second and fourth contacts and thereafter placing the craft in a roll maneuver.

What is claimed is:

1. In a device for aligning in azimuth a slave stabilized platform with a master stabilized platform, each being supported on an individual movable vehicle and each containing a pair of accelerometers oriented at right angles to one another, corresponding ones of the respective pairs lying nearly parallel, and the planes of the two pairs being substantially parallel, means for receiving signals from all four accelerometers in response to acceleratory movement of both platforms in the same direction, means for incrementally integrating the signals received from the master platform accelerometers to provide first and second signals, means for incrementally integrating the difference in the signals between the corresponding one of the master platform accelerometers and one of the slave platform accelerometers to provide a third signal, and means for incrementally integrating the difference between the remaining master platform accelerometer signal and the remaining slave platform accelerometer signal, to provide a fourth signal, a dividing means, and means for selectively introducing said third and second signals and said fourth and first signals into said dividing means to selectively obtain the quotient thereof in response to whether said first signal is greater in amplitude than said second signal.

2. In the device of claim 1, means for receiving signals from the master platform proportional to pitch movement and proportional to roll movement thereof, means for receiving a signal from the slave platform proportional to pitch movement thereof, means for differentiating and then integrating said master platform roll signal, to yield a fifth signal, means for differentiating and then integrating the difference between said pitch signals from said master platform and slave platform to yield a sixth signal, and means for selectively connecting said fifth and sixth signals to said dividing means instead of said third and second signals and said fourth and first signals.

References Cited in the file of this patent
UNITED STATES PATENTS

| 2,725,191 | Ham | Nov. 29, 1955 |
| 2,855,145 | Patterson | Oct. 7, 1958 |
| 2,967,018 | Fogarty | Jan. 3, 1961 |